(12) United States Patent
Sidiropoulos

(10) Patent No.: US 10,816,170 B2
(45) Date of Patent: *Oct. 27, 2020

(54) INTERFACE FOR COVER PLATE

(71) Applicant: Hubbell Incorporated, Shelton, CT (US)

(72) Inventor: Rachel Lynn Sidiropoulos, Middleboro, MA (US)

(73) Assignee: Hubbell Incorporated, Shelton, CT (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/727,068

(22) Filed: Dec. 26, 2019

(65) Prior Publication Data

US 2020/0132280 A1 Apr. 30, 2020

Related U.S. Application Data

(63) Continuation of application No. 15/866,531, filed on Jan. 10, 2018, now Pat. No. 10,520,173.

(60) Provisional application No. 62/500,008, filed on May 2, 2017, provisional application No. 62/445,066, filed on Jan. 11, 2017.

(51) Int. Cl.
| | |
|---|---|
| F21V 21/00 | (2006.01) |
| F21V 21/04 | (2006.01) |
| H02G 3/20 | (2006.01) |
| H02G 3/38 | (2006.01) |
| F21S 8/06 | (2006.01) |
| F21V 21/03 | (2006.01) |

(52) U.S. Cl.
CPC ............ *F21V 21/041* (2013.01); *F21S 8/061* (2013.01); *F21V 21/03* (2013.01); *F21V 21/047* (2013.01); *H02G 3/20* (2013.01); *H02G 3/381* (2013.01)

(58) Field of Classification Search
CPC ...... F21V 21/041; F21V 21/03; F21V 21/047; F21S 8/061; H02G 3/02; H02G 3/381
USPC ................ 362/365, 364, 398, 147, 148, 150
See application file for complete search history.

(56) References Cited

U.S. PATENT DOCUMENTS

| | | | |
|---|---|---|---|
| 7,591,675 B2 * | 9/2009 | Ratican ................. | H01R 33/94 439/531 |
| 7,748,869 B2 | 7/2010 | Sevack | |
| 8,425,082 B2 | 4/2013 | Wang | |
| 10,465,871 B2 * | 11/2019 | Feit ..................... | F21V 19/0045 |
| 10,520,173 B2 * | 12/2019 | Sidiropoulos ......... | F21V 21/041 |
| 2005/0265016 A1 | 12/2005 | Rappaport | |
| 2007/0014118 A1 * | 1/2007 | Shourds ................. | F21S 8/02 362/407 |
| 2007/0127234 A1 * | 6/2007 | Jervey, III ............. | F21V 21/03 362/147 |

(Continued)

*Primary Examiner* — Laura K Tso
(74) *Attorney, Agent, or Firm* — Michael Best & Friedrich, LLP

(57) ABSTRACT

A system for mounting pendant lighting fixtures includes an interface component adapted to be at least partially retained in an opening defined by a ceiling. The interface component defines at least one aperture to accommodate a hanging support extending through the opening and configured to support a pendant lighting fixture. The system includes a cover plate defining at least one aperture to accommodate the hanging support. The system also includes at least one magnetic element operable to exert a magnetic bias on the cover plate to secure the cover plate against the interface component and at least partially cover the opening.

18 Claims, 10 Drawing Sheets

(56) References Cited

U.S. PATENT DOCUMENTS

| | | |
|---|---|---|
| 2013/0163254 A1 | 6/2013 | Chang |
| 2013/0272019 A1 | 10/2013 | Engstrom |
| 2013/0286667 A1* | 10/2013 | Sampsell ................ F21S 8/026 362/368 |
| 2014/0036517 A1* | 2/2014 | Machiorlette ......... F21V 21/008 362/387 |
| 2017/0191642 A1 | 7/2017 | Xu |
| 2017/0254516 A1 | 9/2017 | Zhu |

* cited by examiner

INTERFACE FOR COVER PLATE

PRIORITY CLAIM

The present application is a continuation of U.S. patent application Ser. No. 15/866,531, filed on Jan. 10, 2018, entitled "INTERFACE FOR COVER PLATE," which claims the benefit of priority of U.S. Provisional Patent Application No. 62/445,066, entitled "INTERFACE FOR COVER PLATE," filed Jan. 11, 2017, and U.S. Provisional Patent Application No. 62/500,008 entitled "INTERFACE FOR COVER PLATE," filed May 2, 2017, each of which is incorporated herein by reference for all purposes.

FIELD

The present subject matter relates generally to lighting fixtures.

BACKGROUND

Lighting fixtures can be used for providing lighting for a space, such as a building or room. Lighting fixtures can be mounted to a ceiling or other surface by securing the lighting fixture to mounting hardware secured on or within the surface. For instance, a pendant lighting fixture can be suspended (e.g., using cables or other suspension feature) from mounting hardware mounted on or within a ceiling. In some cases, the mounting hardware may not be visually appealing. In addition, the mounting hardware may be installed in a ceiling that defines a plenum above the room. In some cases, it may be desirable to seal off the plenum from the rest of the room.

BRIEF DESCRIPTION

Aspects and advantages of embodiments of the present disclosure will be set forth in part in the following description, or may be learned from the description, or may be learned through practice of the embodiments.

One example aspect of the present disclosure is directed to a system for mounting pendant lighting fixtures. The system includes an interface component adapted to be at least partially retained in an opening defined by a ceiling. The interface component defines at least one aperture to accommodate a hanging support extending through the opening and configured to support a pendant lighting fixture. The system includes a cover plate defining at least one aperture to accommodate the hanging support. The system includes at least one magnetic element operable to exert a magnetic bias on the cover plate to secure the cover plate against the interface component and at least partially cover the opening.

Another example aspect of the present disclosure is to an interface component for pendant lighting fixtures. The interface component defines a radial direction and a circumferential direction. The interface component includes a top defining at least one aperture to accommodate a hanging support for a pendant lighting fixture. The interface component includes a bottom spaced apart from the top. The interface component also includes sidewall extending between the top and bottom. The interface component includes at least one support surface positioned between the top and the bottom along the radial direction. The at least one support surface is configured to support a magnetic element operable to exert a magnetic bias on a cover plate to secure the cover plate against the bottom.

Yet another example aspect of the present disclosure is directed to a pendant lighting fixture system. The pendant lighting fixture system includes a mounting component adapted to be secured to a support positioned within a space above a ceiling. The pendant lighting fixture system includes a pendant lighting fixture adapted to be suspended from the ceiling via at least one hanging support extending from the mounting component. The pendant lighting fixture system includes an interface component adapted to be at least partially retained in an opening defined by the ceiling. The interface component defines at least one aperture to accommodate the at least one hanging support. The pendant lighting fixture system includes a cover plate defining at least one aperture to accommodate the at least one hanging support. The pendant lighting fixture system includes at least one magnetic element operable to exert a magnetic bias on the cover plate to secure the cover plate against the interface component so that the cover at least partially covers the opening.

Variations and modifications can be made to these example aspects of the present disclosure.

These and other features, aspects and advantages of various embodiments will become better understood with reference to the following description and appended claims. The accompanying drawings, which are incorporated in and constitute a part of this specification, illustrate embodiments of the present disclosure and, together with the description, serve to explain the related principles.

BRIEF DESCRIPTION OF THE DRAWINGS

Detailed discussion of embodiments directed to one of ordinary skill in the art are set forth in the specification, which makes reference to the appended figures, in which.

DETAILED DESCRIPTION

Figure 1:
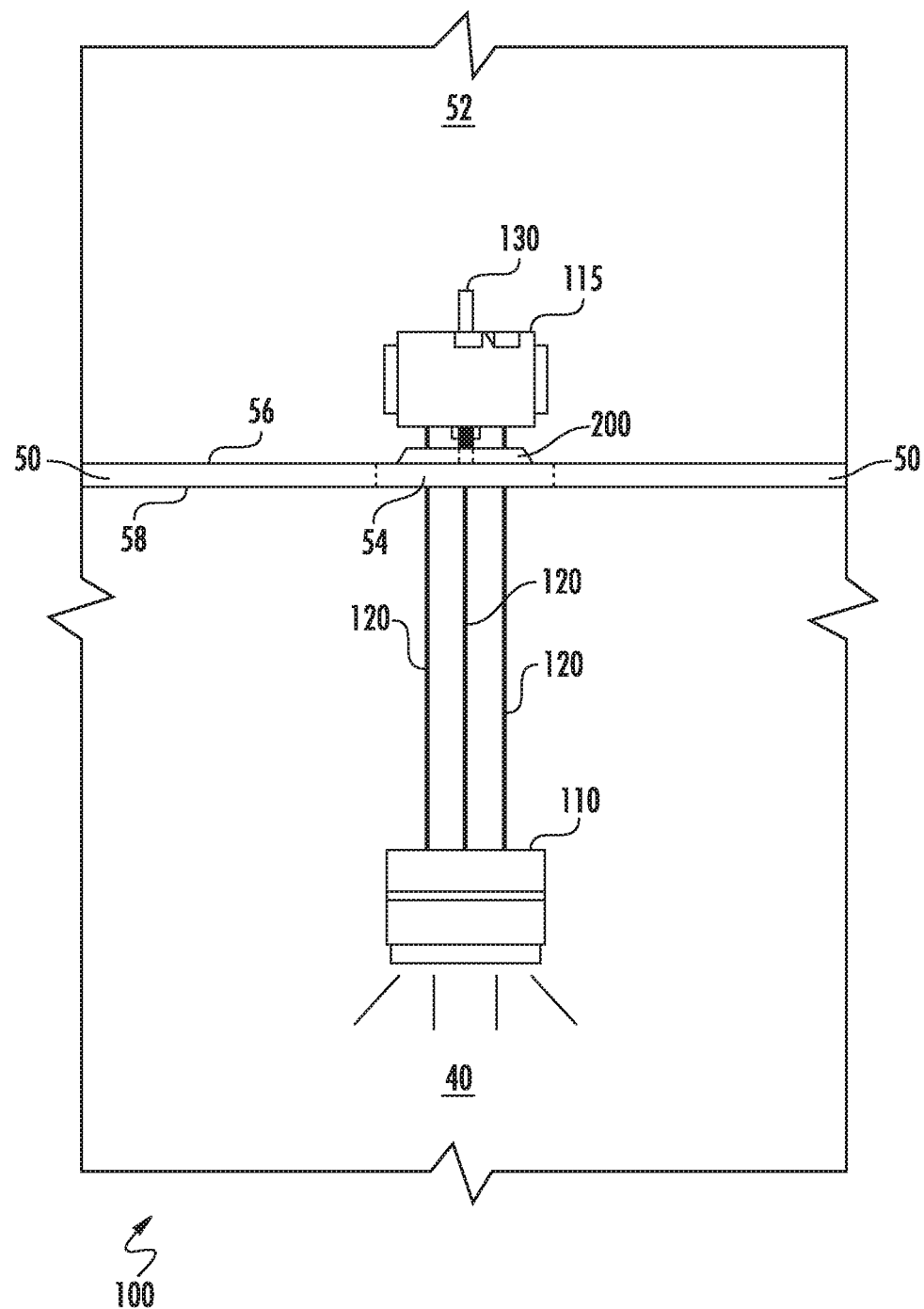
FIG. 1 depicts an example pendant lighting fixture suspended from a ceiling according to example embodiments of the present disclosure.

Reference now will be made in detail to embodiments, one or more examples of which are illustrated in the drawings. Each example is provided by way of explanation of the embodiments, not limitation of the present disclosure. In fact, it will be apparent to those skilled in the art that various modifications and variations can be made to the embodiments without departing from the scope or spirit of the present disclosure. For instance, features illustrated or described as part of one embodiment can be used with another embodiment to yield a still further embodiment. Thus, it is intended that aspects of the present disclosure cover such modifications and variations.

Example aspects of the present disclosure are directed to an interface component that can be used to facilitate easy installation and removal of a cover plate relative to mounting hardware for a lighting fixture, such as a pendant mount lighting fixture. In some embodiments, the interface component can include one or more magnetic elements. The interface component can be secured within an opening defined by a ceiling or other surface. In addition, a cover plate comprised of a magnetic material can be secured to the interface component via a magnetic bias that the one or more magnetic elements exert on the cover plate. When the cover plate is installed (e.g., secured to the interface component), the cover plate seals off a space above the ceiling. This is desirable, because the cover plate can visually hide mounting hardware and other components (e.g., enclosures for driver circuits, etc.) of the lighting fixture. Furthermore, since the cover plate is secured to the interface component via magnetic force, the cover plate can be easily removed without tools (e.g., using a force applied by hand). As an example, applying a force to one side of the cover plate can dislodge the cover plate from the one or more magnetic elements that are retaining the cover plate via the magnetic force.

For example, a pendant lighting fixture can be suspended from a mounting component located in a plenum that is separated from a room or space by a ceiling. In particular, the pendant lighting fixture can be suspended from the mounting hardware via one or more support cables. The one or more support cables can pass through an interface component secured to the ceiling. The interface component can include a plurality of magnetic components located, for instance, 180° apart from one another. A steel cover plate including apertures for the support cables can be secured to the magnetic components via the magnetic force. The steel cover plate can rotate upon the application of an external force (e.g., a hand force) to become dislodged. This facilitates easy removal of the cover plate for access to mounting hardware disposed above the ceiling. The cover plate can seal off the plenum from the room when the cover plate is installed and retained by the interface component with magnetic force.

Example aspects of the present disclosure are discussed with reference to a pendant mount lighting fixture for purposes of illustration and discussion. Those of ordinary skill in the art, using the disclosures provided herein, will understand that example aspects of the present disclosure can be used with other lighting fixtures or components without deviating from the scope of the present disclosure.

FIG. 1 depicts an example pendant mount lighting fixture system 100 according to example embodiments of the present disclosure. The pendant mount lighting fixture system 100 can include a pendant mount lighting fixture 110 (e.g., a hanging pendant cylinder) having one or more light sources (e.g., LED light sources) configured to provide illumination for a space 40.

The lighting fixture 110 can be suspended from a mounting component 115 using a plurality of hanging supports 120. The hanging supports 120 can be, for instance, cables, wires, stems, or other suitable hanging supports 120 that can pass through an opening 54 defined by a ceiling 50. In some example embodiments, the ceiling 50 can be a suspended ceiling. Alternatively, the ceiling 50 can be a drywall ceiling. In one example embodiment, the hanging supports 120 can be Class 2 power over aircraft cable. It should be appreciated that more or fewer hanging supports 120 can be used without deviating from the scope of the present disclosure.

Figure 2:
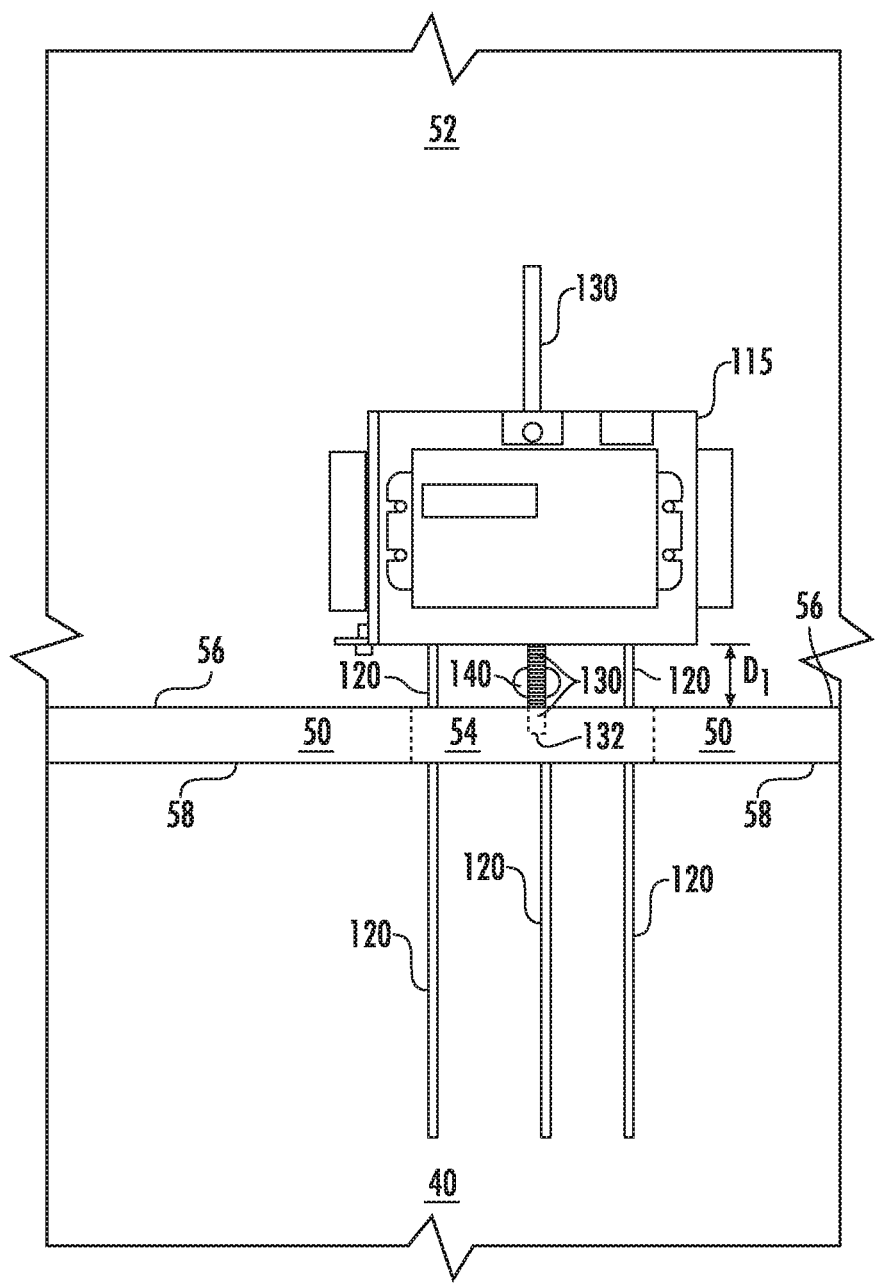
FIG. 2 depicts an example mounting component of FIG. 1 in a first position.

The mounting component 115 can be secured to a support 130 positioned within a plenum 52 or other space located above the ceiling 50. In one example embodiment, the support 130 can be a threaded rod that extends through the mounting component 115. Alternatively or additionally, the support 130 can be aligned with the opening 54 such that the support 130 extends into the opening 54. As shown in FIG. 2, an end 132 of the support 130 can extend into the opening 54. More specifically, the end 132 of the support 130 can be positioned between a top 56 of the ceiling 50 and a bottom 58 of the ceiling 50. It should be appreciated, however, that the end 132 of the support 130 can be positioned at any suitable location between the mounting component 115 and the bottom 58 of the ceiling 50.

Figure 3:
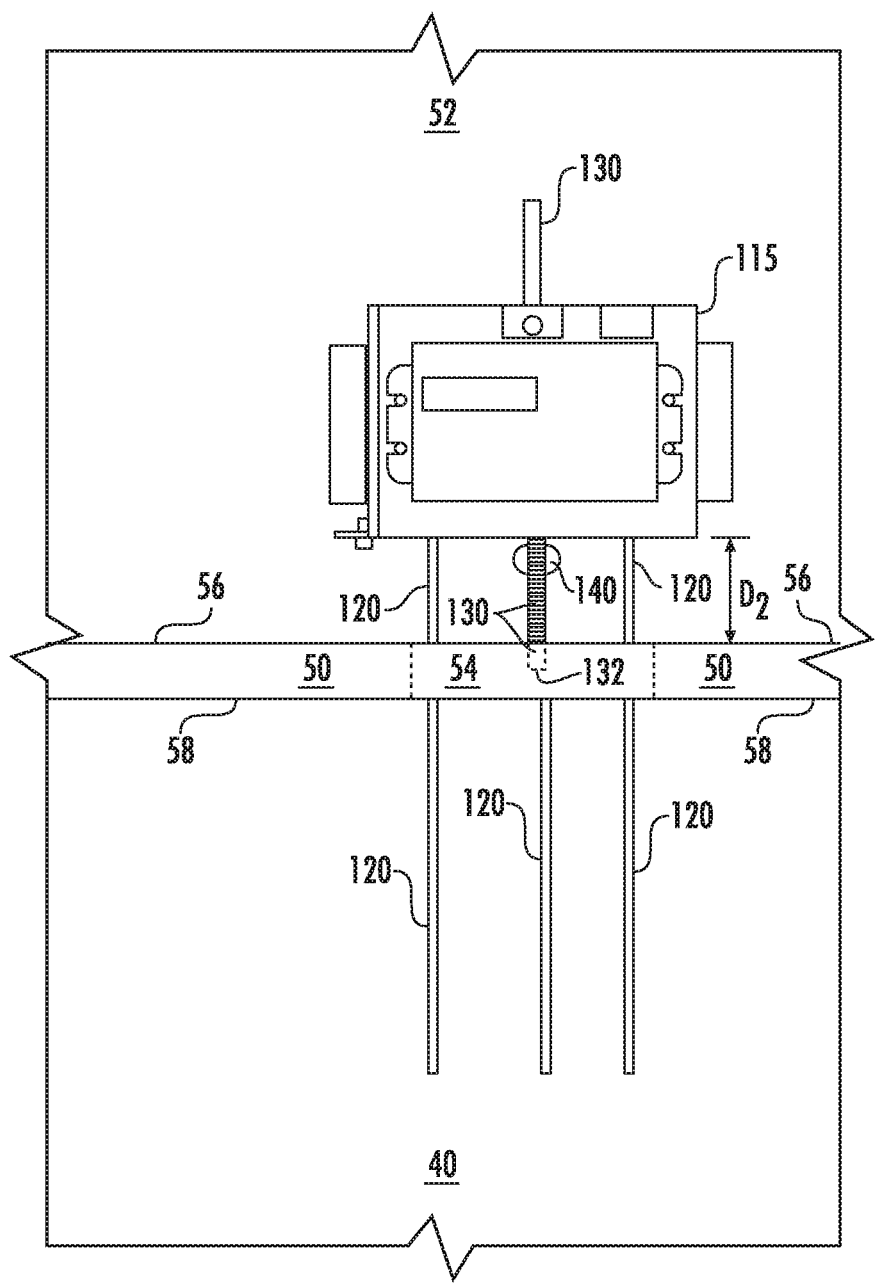
FIG. 3 depicts an example mounting component of FIG. 1 in a second position.

Referring briefly now to FIGS. 2 and 3, the mounting component 115 can be secured to the support 130 via a threaded fastener 140. In one example embodiment, the threaded fastener 140 can mate with threads formed on the support 130. As will be discussed below in more detail, once the threaded fastener 140 initially mates with the threads formed on the support 130, the threaded fastener 140 can then be rotated in either a first direction (e.g., clockwise) or a second direction (e.g., counterclockwise) to move the mounting component 120 along a length of the support 130.

In one example embodiment, the threaded fastener can be rotated in the first direction to move the mounting component 115 to a first position (FIG. 2). When the mounting component 115 is in the first position, a first distance $D_1$ is defined between the mounting component 115 and the top 56 of the suspending ceiling 50. The threaded fastener 140 can be further rotated in the first direction to move the mounting component 115 from the first position to a second position (FIG. 3). When the mounting component 115 is in the second position, a second distance $D_2$ is defined between the mounting component 115 and the top 56 of the ceiling 50. It should be appreciated that the second distance $D_2$ is greater than the first distance $D_1$. It should be also be appreciated that the first and second distances $D_1$ and $D_2$ can include any suitable range of values. In one example embodiment, the first distance $D_1$ can be any value greater than or equal to 1.5 inches, and the second distance $D_2$ can be any value greater than or equal to 1.75 inches.

When the mounting component 115 is in the second position, the threaded fastener 140 can be rotated in the second direction (e.g., counterclockwise) to return the mounting component 115 to the first position. Furthermore, after the mounting component 115 has returned to the first position, the threaded fastener 140 can continue to be rotated in the second direction until the threaded fastener 140 no longer mates with the threads formed on the support 130.

Figure 4:
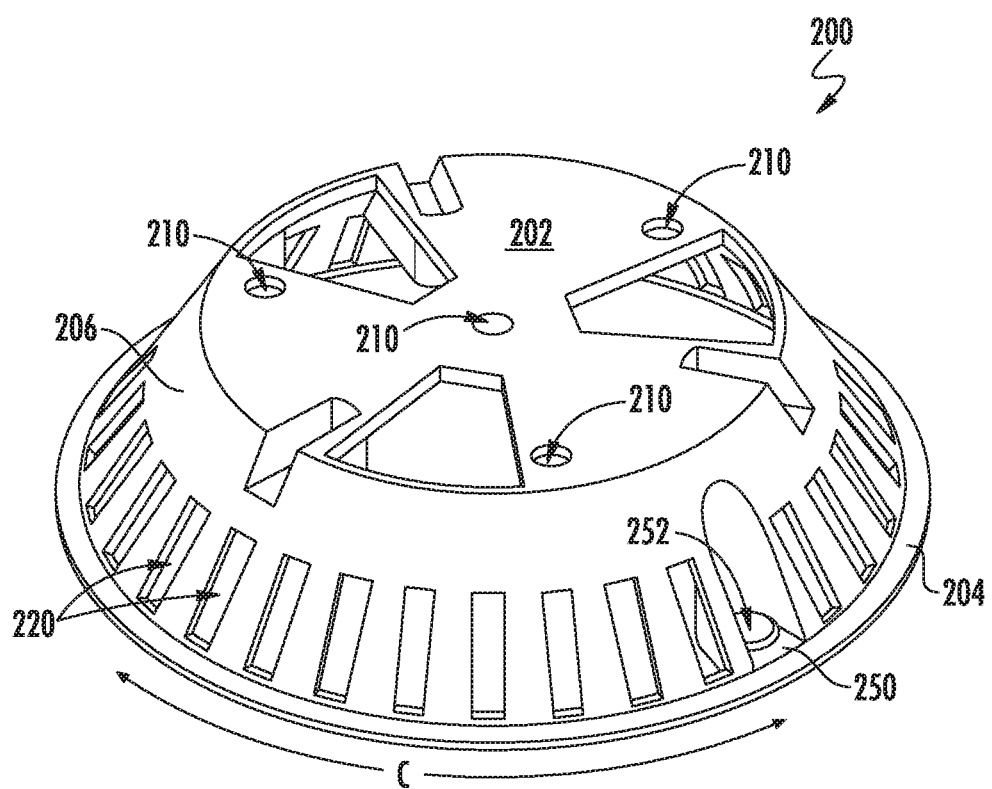
FIG. 4 depicts a perspective view of an example interface component according to example embodiments of the present disclosure.
Figure 5:
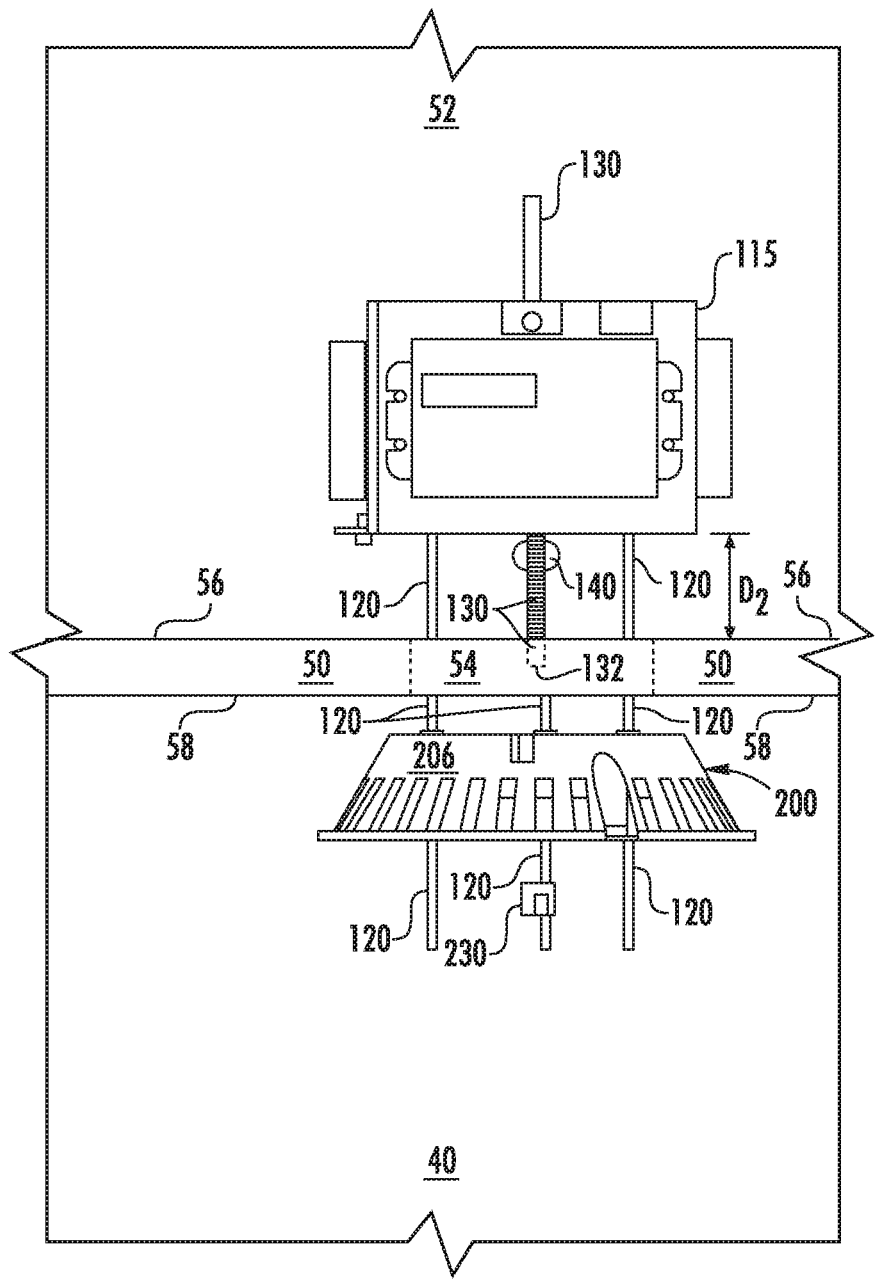
FIG. 5 depicts the interface component of FIG. 4 being secured to a ceiling according to example embodiments of the present disclosure.

Referring now to FIGS. 4 and 5, an interface component 200 can be positioned within the opening 54 defined by the ceiling 50. As shown, the interface component 200 can include a top 202, a bottom 204 spaced apart from the top 202, and a sidewall 206 extending between the top 202 and the bottom 204. In one example embodiment, the interface component 200 defines a frustoconical shape in which a perimeter of the bottom 204 is greater than a perimeter of the top 202. Alternatively or additionally, the top 202 can define a plurality of apertures 210 to accommodate both the hanging supports 120 and the support 130 that pass therethrough. The sidewall 206 can be tapered and can define a plurality of slots 220. Each slot of the plurality of slots 220 can be spaced apart from one another along a circumferential direction C. It should be appreciated that the interface component 200 can be comprised of any suitable material. In one example embodiment, the interface component 200 can be comprised of cast aluminum.

As shown, the support 130 can extend through one of the plurality of apertures 210 defined by the top 202 of the interface component 200. A threaded fastener 230 can be fastened to the end 132 of the support 130. Once fastened to the end 132 of the support 130, the threaded fastener 230 can be rotated in either the first direction (e.g., clockwise) or the second direction (e.g., counterclockwise) to secure the interface component 200 to the ceiling 50. In one example embodiment, the threaded fastener 230 can be rotated until the bottom 204 of the interface component 200 is secured against the bottom 58 of the ceiling 50. Alternatively, the threaded fastener 230 can be rotated until the sidewall 206 of the interface component 200 is positioned between the top 56 of the ceiling 50 and the bottom 58 of the ceiling 50.

Figure 6:
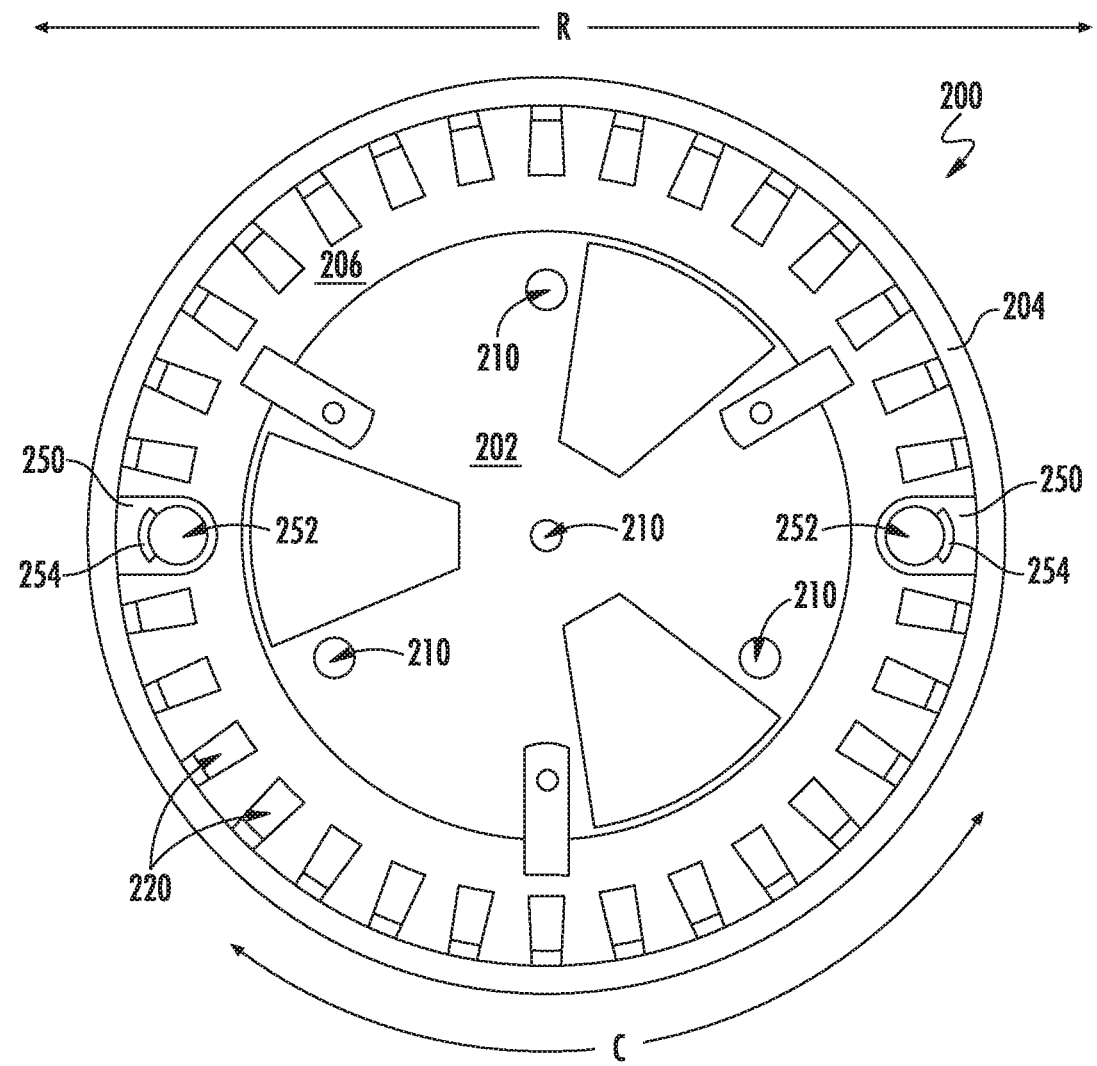
FIG. 6 depicts a top-down view of the example interface component depicted in FIG. 4.

FIG. 6 depicts a plan view of an example interface component 200 according to example embodiments of the present disclosure. As shown, the interface component 200 can include a pair of support surfaces 250 spaced apart from one another along the circumferential direction C. In one example embodiment, each support surface 250 is disposed between the top 202 and bottom 204 along a radial direction. In addition, each support surface 250 can define an aperture 252. As shown, the aperture 252 can define a maximum diameter $D_A$.

Still referring to FIG. 6, each support surface 250 can include a raised portion 254. As shown, the raised portion 254 can be positioned adjacent the aperture 252. In one example embodiment, the raised portion 254 can extend around a portion of the aperture 252. As will be discussed below in more detail, the raised portion 254 can limit movement of a magnetic element that is positioned on the support surface 250.

Figure 7:
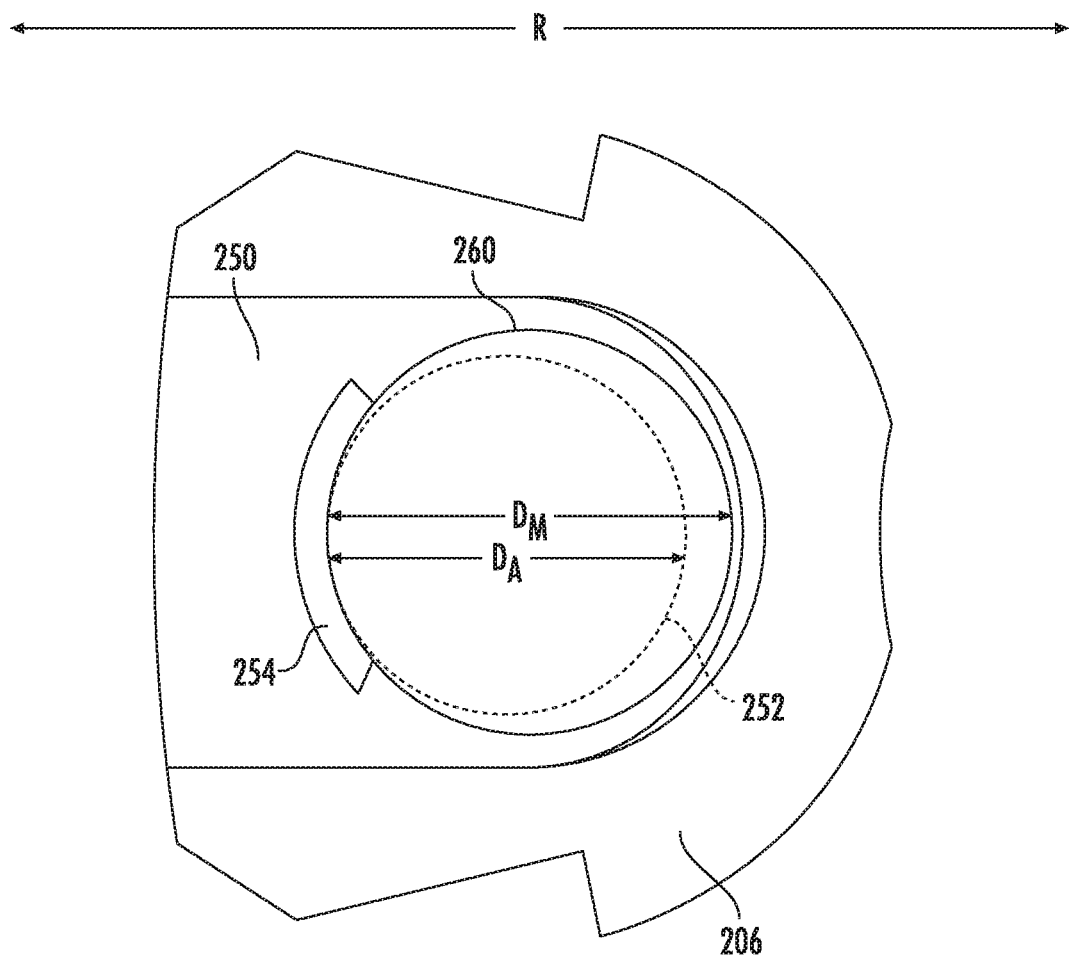
FIG. 7 depicts an example support surface of the example interface component depicted in FIGS. 4 and 6.

FIG. 7 depicts a close up view of one of the support surfaces 250 retaining a magnetic element 260. As shown, the magnetic element 260 can define a maximum diameter $D_M$ that is greater than the maximum diameter $D_A$ defined by the aperture 252. Further, the magnetic element 260 can be positioned on the support surface 250 so that the magnetic element 260 is positioned over the aperture 252. In one example embodiment, the magnetic element 260 can be positioned between the raised portion 254 of the support surface 250 and a portion of the sidewall 206 along the radial direction R. As such, the raised portion 254 of the support surface 250 can, at least in part, limit movement of the magnetic element 260 along the radial direction R.

It should be appreciated that the magnetic element 260 can be any material (e.g., permanent magnet, steel, etc.) configured to interact with another component by magnetic force. For instance, the magnetic element 260 can be a permanent magnet configured to interact with a metal material (e.g., steel) of a cover plate using magnetic force. In addition, the magnetic element 260 can be a metal material (e.g., steel) configured to interact with a permanent magnet located on, for instance a cover plate. As shown in FIG. 6, the pair of supports 250 can be arranged 180° apart from one another along the circumferential direction C so that the magnetic elements 260 define an axis.

Figure 8:
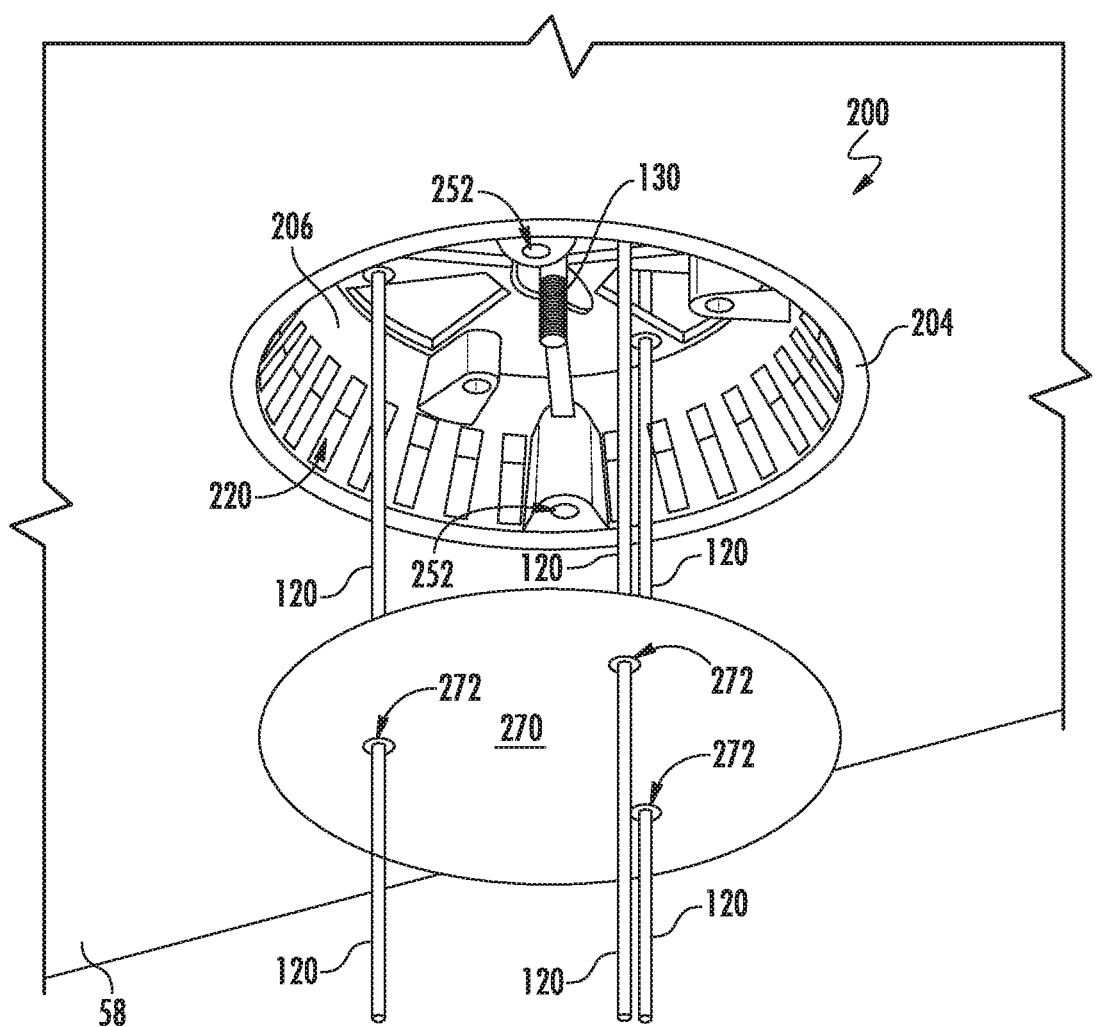
FIG. 8 depicts an example interface component and cover plate according to example embodiments of the present disclosure.

FIG. 8 depicts an example cover plate 270 that can interface with the interface component 200. The cover plate 270 can include a material such as steel or any other suitable material that can interact with the magnetic elements 260. As shown, the cover plate 270 can define a plurality of apertures 272, and each aperture of the plurality of apertures 272 can accommodate one of the hanging supports 120. The cover plate 270 can be retained by a magnetic bias that the magnetic elements 260 exerts on the cover plate 270. In one example embodiment, the magnetic elements 260 can retain the cover plate 270 against the interface component 200 so that the cover plate 270 covers the opening 54 and, in effect, seals the plenum 52 from the space 40 below the ceiling 50.

Figure 9:
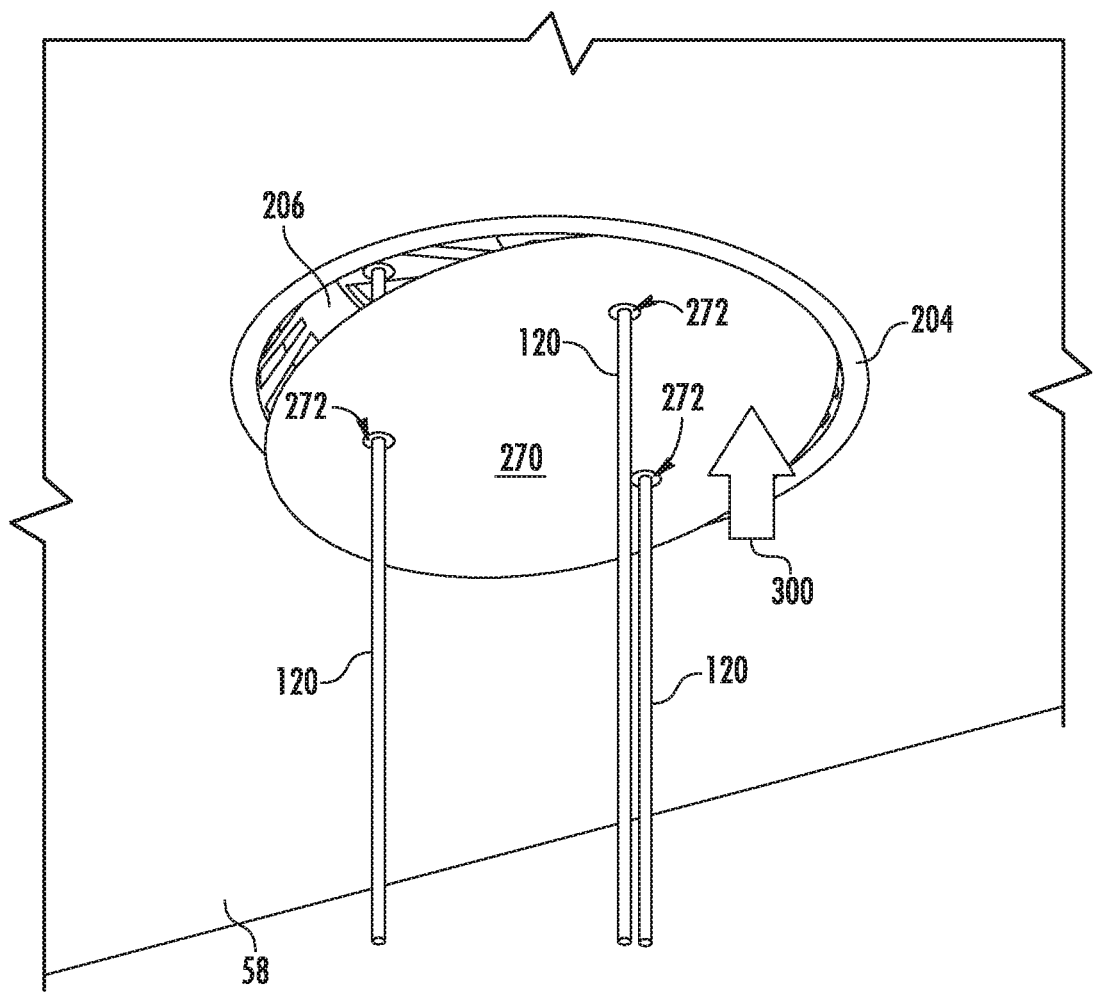
FIG. 9 depicts the example removal of a cover plate from an interface component according to example embodiments of the present disclosure.

FIG. 9 depicts the easy removal of the cover plate 270 from the interface component 200. As shown, a force 300 can be applied to one side of the cover plate 270. In particular, the force 300 can cause the cover plate 270 to rotate about an axis defined by the magnetic elements 260 (or an axis parallel to the axis defined by the magnetic elements 260). As the cover plate 270 rotates about the axis, the cover plate 270 can be displaced from the magnetic elements 260 so that the cover plate 270 can be removed from the interface component 200. In this way, the cover plate 270 can be removed without requiring tools, because the force 300 can be applied, for instance, by hand.

After the cover plate 270 and the interface component 200 have been removed, it should be appreciated that the mounting component 115 (FIG. 1) and other hardware positioned within the plenum 52 above the ceiling 50 can be accessed through the opening 54. As such, a user can repair or replace the mounting component 115 from the space 40 positioned below the ceiling 50. Then, once the user has finished repairing or replacing the mounting component 115, the user can reinstall the interface component 200 through manipulation (e.g., rotation) of the mounting component 230. Further, once the interface component 200 has been reinstalled, the user can hold the cover plate 270 over the opening 54 so that the magnetic elements 260 can, once again, exert the magnetic force on the cover plate 270.

Figure 10:
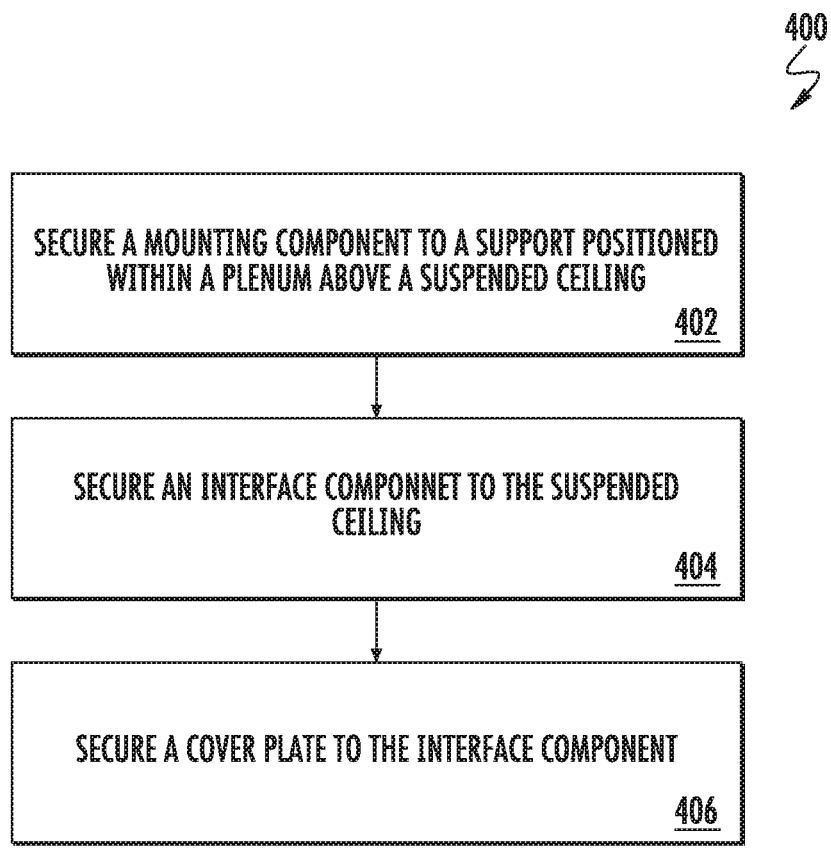
FIG. 10 depicts an example method for installing a pendant mount lighting fixture system according to example embodiments of the present disclosure.

Referring now to FIG. 10, a flow diagram of one embodiment of a method 400 for mounting a pendant mount lighting fixture system is illustrated in accordance with example embodiments of the present disclosure. In general, the method 400 will be discussed herein with reference to the pendant mount lighting fixture system 100 described above with reference to FIGS. 1-9. However, it should be appreciated by those of ordinary skill in the art that the disclosed method 400 can generally be implemented with pendant mount lighting fixture systems having any other suitable configuration. In addition, although FIG. 10 depicts steps performed in a particular order for purposes of illustration and discussion, the method discussed herein is not limited to any particular order or arrangement. One skilled in the art, using the disclosure provided herein, will appreciate that various steps of the method disclosed herein can be omitted, rearranged, combined, and/or adapted in various ways without deviating from the scope of the present disclosure.

As shown in FIG. 10, at (402), the method 400 can include securing a mounting component to a support. Specifically, in one example embodiment, the support can be positioned within a plenum above a ceiling, and the mounting component can be secured to the support via manipulation of a threaded fastener configured to mate with threads formed on the outside of the support. When the mounting component is secured to the support, it should be appreciated that the mounting component is positioned within the plenum above the ceiling.

At (404), the method 400 can include securing an interface component to the ceiling. Specifically, in one example embodiment, the interface component can be secured to the ceiling via a threaded fastener configured to mate with the threads formed on the support. The support can pass through an aperture defined by the top of the interface component, and the threaded fastener can be rotated in either a first direction (e.g., clockwise) or a second direction (e.g., counterclockwise) to secure the interface component to the ceiling.

At (406), the method 400 can include securing a cover plate to the interface component. Specifically, in one example embodiment, the cover plate can be retained against the interface component via a magnetic force. In particular, the interface component can include a pair of supports, and each support can retain a magnetic element configured to exert the magnetic force on the cover plate. When the cover plate is retained against the interface component, the cover plate can seal an opening defined by the ceiling and, in effect, seal the plenum from a room positioned beneath the ceiling.

While the present subject matter has been described in detail with respect to specific example embodiments thereof, it will be appreciated that those skilled in the art, upon attaining an understanding of the foregoing, may readily produce alterations to, variations of, and equivalents to such embodiments. Accordingly, the scope of the present disclosure is by way of example rather than by way of limitation, and the subject disclosure does not preclude inclusion of such modifications, variations and/or additions to the present subject matter as would be readily apparent to one of ordinary skill in the art.

What is claimed is:

1. A system for a pendant lighting fixture suspended from a ceiling via a hanging support, the system comprising:
    an interface component defining an aperture; and
    a cover plate defining an aperture,
    wherein when the cover plate is secured to the interface component via a magnetic bias and the interface component is secured to the ceiling such that a portion of the interface component is positioned within an opening defined by the ceiling, the hanging support passes through the aperture defined by the interface component and the aperture defined by the cover plate.

2. The system of claim 1, further comprising:
    a magnetic element positioned on a surface of the interface component, the magnetic element operable to exert the magnetic bias to secure cover plate to the interface component.

3. The system of claim 2, wherein the surface of the interface component defines an aperture.

4. The system of claim 3, wherein the magnetic element is positioned on the surface of the interface component such that the magnetic element is visible through the aperture defined by the surface.

5. The system of claim 2, wherein the portion of the interface component positioned within the opening comprises the surface on which the magnetic element is positioned.

6. The system of claim 1, wherein the interface component defines a plurality of slots, each of the plurality of slots spaced apart from one another along a circumferential direction.

7. The system of claim 6, wherein when the cover plate is secured to the interface component via a magnetic bias and the interface component is secured to the ceiling such that the portion of the interface component is positioned within the opening defined by the ceiling, the plurality of slots are hidden from view via the cover plate.

8. The system of claim 1, wherein when the cover plate is secured to the interface component via a magnetic bias and the interface component is secured to the ceiling such that a portion of the interface component is positioned within the opening defined by the ceiling, the aperture defined by the interface component is spaced apart from the opening along a vertical direction.

9. The system of claim 1, wherein the interface component defines a frustoconical shape.

10. An interface component for a pendant lighting fixture suspended from a ceiling via a hanging support, the interface component defining a circumferential direction and a radial direction, the interface component comprising:
    a top portion defining an aperture to accommodate the hanging support;
    a bottom portion spaced apart from the top portion; and
    a sidewall extending between the top portion and the bottom portion,
    wherein when the interface component is secured to the ceiling such that at least a portion of the sidewall is positioned within an opening defined by the ceiling, the hanging support passes through the aperture defined by the top portion of the interface component and wherein further the sidewall defines a plurality of slots spaced apart from one another along the circumferential direction.

11. The interface component of claim 10, wherein the bottom portion of the interface component contacts the ceiling when the portion of the sidewall is positioned within the opening.

12. The interface component of claim 10, further comprising:
    a first surface positioned between adjacent slots of the plurality of slots along the circumferential direction, the first surface defining an aperture; and
    a second surface spaced apart from the first surface along the circumferential direction, the second surface positioned between adjacent slots of the plurality of slots along the circumferential direction, the second surface defining an aperture.

13. The interface component of claim 10, wherein when the interface component is secured to the ceiling such that the at least a portion of the sidewall is positioned within the opening defined by the ceiling, the aperture defined by the top portion of the interface component is spaced apart from the opening along a vertical direction.

14. A pendant lighting fixture system, comprising:
    a pendant lighting fixture;
    a hanging support couplable to the pendant lighting fixture to support the pendant lighting fixture from a ceiling;
    an interface component defining an aperture; and
    a cover plate defining an aperture,
    wherein when the cover plate is secured to the interface component via a magnetic bias and the interface component is secured to the ceiling such that a portion of the interface component is positioned within an opening defined by the ceiling, the hanging support passes through the aperture defined by the interface component and the aperture defined by the cover plate.

15. The pendant lighting fixture system of claim 14, further comprising:

a magnetic element positioned on a surface of the interface component, the magnetic element operable to exert the magnetic bias to secure cover plate to the interface component.

16. The pendant lighting fixture system of claim 15, wherein the surface of the interface component defines an aperture.

17. The pendant lighting fixture system of claim 16, wherein the magnetic element is positioned on the surface of the interface component such that the magnetic element is visible through the aperture defined by the surface.

18. The pendant lighting fixture system of claim 15, wherein the portion of the interface component positioned within the opening comprises the surface on which the magnetic element is positioned.

\* \* \* \* \*